United States Patent
Kerger et al.

(10) Patent No.: US 11,267,015 B2
(45) Date of Patent: Mar. 8, 2022

(54) DEVICE FOR LACQUER TRANSFER

(71) Applicants: Airbus Operations GmbH, Hamburg (DE); Airbus (SAS), Blagnac (FR)

(72) Inventors: Sebastian Kerger, Hamburg (DE); Christian Schepp, Hamburg (DE); Daniel Kress, Hamburg (DE); Waldemar Kümmel, Hamburg (DE)

(73) Assignees: Airbus Operations GmbH, Hamburg (DE); Airbus (SAS), Blagnac (FR)

( * ) Notice: Subject to any disclaimer, the term of this patent is extended or adjusted under 35 U.S.C. 154(b) by 0 days.

(21) Appl. No.: 16/861,547

(22) Filed: Apr. 29, 2020

(65) Prior Publication Data

US 2020/0346240 A1    Nov. 5, 2020

(30) Foreign Application Priority Data

Apr. 30, 2019   (DE) .......................... 102019111235.4

(51) Int. Cl.
  *B05C 1/08* (2006.01)
  *B25J 11/00* (2006.01)
  *B64F 5/00* (2017.01)

(52) U.S. Cl.
  CPC .......... *B05C 1/0813* (2013.01); *B05C 1/0808* (2013.01); *B05C 1/0821* (2013.01); *B25J 11/0075* (2013.01); *B64F 5/00* (2013.01)

(58) Field of Classification Search
  CPC ....... B05C 1/0813; B05C 1/0808; B05C 9/14; B05C 17/0217; B05C 1/0821; B25J 11/0075; B25J 11/00; B64F 5/00
  USPC ........................................................ 118/304
  See application file for complete search history.

(56) References Cited

U.S. PATENT DOCUMENTS

| 6,475,283 | B1* | 11/2002 | Koehn | .................. B05C 1/0813 118/304 |
| 6,531,025 | B1 | 3/2003 | Lender et al. | |
| 2001/0032585 | A1* | 10/2001 | Koehn | .................. B05C 1/0808 118/304 |
| 2006/0134333 | A1* | 6/2006 | Nagase | .................... B44D 7/00 427/299 |
| 2013/0205530 | A1 | 8/2013 | Dale | |

FOREIGN PATENT DOCUMENTS

| DE | 11 2004 000 417 | 1/2006 |
| DE | 603 07 840 | 4/2007 |
| DE | 602 24 081 | 12/2008 |
| WO | 2015/155128 | 10/2015 |

* cited by examiner

*Primary Examiner* — Laura Edwards
(74) *Attorney, Agent, or Firm* — Nixon & Vanderhye P.C.

(57) ABSTRACT

A device for lacquer transfer is disclosed having a frame, a transfer roller with a circumferential lateral wall, and a nozzle for dispensing lacquer. The nozzle is arranged contactless to or in direct contact with the outside contact surface of the lateral wall for dispensing lacquer into respective depressions in the lateral wall while the transfer roller is rotated about the axis of rotation. The transfer roller is configured to roll with the outside contact surface on a work surface of a work piece for transferring the lacquer from the depressions to the work surface of the work piece. The transfer roller includes a rim and a tire, wherein the rim is mounted to the frame rotatably about the axis of rotation by the first end and extends between a first end and a second end along the axis of rotation, wherein the tire is mounted on the rim and includes the lateral wall.

12 Claims, 3 Drawing Sheets

DEVICE FOR LACQUER TRANSFER

CROSS REFERENCE TO RELATED APPLICATION

This application claims priority to and incorporates by reference German Application Number DE 10 2019 111 235.4, filed Apr. 30, 2019.

BACKGROUND

The present disclosure relates to a device for lacquer transfer to a work surface, in particular to an aerodynamic surface of an aircraft, such as an outer surface of a wing.

The device comprises a frame, a transfer roller with a circumferential lateral wall, and a nozzle preferably in the form of a slit nozzle with a muzzle end for dispensing lacquer. The nozzle is directly or indirectly connected to the frame. An outside contact surface of the lateral wall comprises several depressions. The transfer roller is mounted rotatably about an axis of rotation at the frame. The nozzle is arranged contactless to or in direct contact with the outside contact surface of the lateral wall for dispensing lacquer into respective depressions in the lateral wall while the transfer roller is rotated about the axis of rotation. The transfer roller is configured to roll with the outside contact surface on a work surface of a work piece for transferring the lacquer from the depressions to the work surface of the work piece.

Further, the transfer roller comprises a rim and a tire. The rim is mounted to the frame rotatably about the axis of rotation, and extends between a first end and a second end along the axis of rotation. The tire is mounted on the rim and includes the lateral wall and preferably also a pressure chamber inside the tire and/or between the lateral wall and the rim, respectively. The rim is rotatably supported at or mounted to the frame by the first end. In particular, the rim might be rotatably mounted to the frame by a shaft mounted to the frame and at least partly extending inside the rim from the first end, so that the rim rotates on the shaft. Alternatively, the rim is rotatably mounted to the frame by a shaft fixedly mounted to the rim either at the first end or such that it extends away from the first end, wherein the shaft is rotatably mounted to or supported at the frame.

A similar device for lacquer transfer is known from WO 2015/155 128 A1.

With known devices for lacquer transfer where the rim is supported at the frame by the first end only, a quick change of the transfer roller is enabled. However, the one-end support results in vibration of the transfer roller at the unsupported second end, which is undesirable for lacquer transfer.

SUMMARY

The present invention provides a device by which the quality of lacquer transfer to the work surface can be increased, while at the same time simple and quick change of the transfer roller is enabled.

The object is achieved in that the rim is additionally supported at the second end at least in a direction perpendicular to the work surface, in particular in a direction to the work surface, by a support device that is mounted to the frame. The support device provides additional support from above at the second end of the rim when the transfer roller is pressed onto the work surface for lacquer transfer, so that vibrations at the second end are widely inhibited. At the same time, the support device is easily removable so that the transfer roller can be quickly removed to the second end, and does not relate to a fixed mounting as it is present at the first end and which would require more time consuming dismounting for the transfer roller to be removed.

The device may comprise a hardening unit that might be connected directly or indirectly to the frame and that might be formed as a UV-light unit configured for hardening the lacquer in a contactless way by emitting UV-light. UV-light within the meaning of the present invention is any kind of UV-radiation. The hardening unit might be arranged within an interior space defined by or formed within the transfer roller. The lateral wall of the transfer roller might be transparent for UV-light. The hardening unit might be arranged such that UV-light is emitted towards the work surface upon which the lateral wall of the transfer roller rolls, to harden the lacquer preferably immediately after it being transferred to the work surface.

The device or at least its frame may be configured to be releasably connected to a handling device, such as a robot with a robot arm. The frame may be configured to be releasably connected to the robot arm. Thus, the device may be a mobile device, in particular a mobile mechanical device.

The frame may form the bases of the device, since the slit nozzle and the hardening unit are each at least indirectly connected to the frame. For this purpose, the device may comprise further connecting means for connecting the slit nozzle to the frame and/or further connecting means for connecting the hardening unit to the frame. Thus, the slit nozzle and the hardening unit may be mounted to the frame. The slit nozzle may be releasably connected to the frame. Thus, the slit nozzle may be disconnected form the frame, in particular for a maintenance purpose. The slit nozzle may be connected to the frame, such that the slit nozzle can be releasably locked in a working position. If this lock is released, the slit nozzle may be pivoted via a hinge, which holds the slit nozzle at the frame. Thus, the slit nozzle may then be subject to a maintenance procedure.

The transfer roller is mounted rotatably to the frame. The transfer roller can therefore rotate about the axis of rotation. For this purpose, the device may comprise a drive unit, which is configured to drive the transfer roller in a rotation direction of the transfer roller about the axis of rotation. The drive unit may also be at least indirectly connected or mounted to the frame. During use, the drive unit drives the transfer roller, such that the transfer roller rotates about the axis of rotation and roles with the contact surface on a work surface. Furthermore, the device is moved translational in parallel to the work surface, preferably by a robot arm or another handling device, while the transfer roller rotates, such that the transfer roller rolls on the work surface for transferring lacquer.

The slit nozzle may be connected via a pipe or a tube to a lacquer supply unit, which may be configured to supply the lacquer via the tube or the pipe to the slit nozzle. The lacquer can be hardened via UV-light. The lacquer supplied to the slit nozzle may be a liquid medium or a viscous medium.

According a first nozzle arrangement of the slit nozzle, the muzzle end of the slit nozzle may be arranged contactless to the outside contact surface of the lateral wall for dispensing lacquer into respective depressions.

According to an alternative second nozzle arrangement of the slit nozzle, the muzzle end of the slit nozzle is arranged in direct contact with the outside contact surface of the lateral wall for dispensing lacquer into respective depressions.

If reference is subsequently made to the slit nozzle without explicitly specifying the first or second nozzle arrangement, the corresponding explanations may, in principle, apply as preferred embodiments to each of the two arrangements. Therefore, it may be possible to apply the respective explanations to one of the first and second nozzle arrangement or to both nozzle arrangements.

The slit nozzle is configured for dispensing lacquer into the depressions of the lateral wall of the transfer roller. The slit nozzle may also be configured for dispensing lacquer onto depression-free sections of the lateral wall of the transfer roller. Thus, the slit nozzle may be configured for dispensing a lacquer film onto the lateral wall of the transfer roller, wherein the lacquer of the lacquer film fills the depressions and the lacquer film extends in axial direction and partly in circumferential direction of the transfer roller. The lacquer film may therefore theoretically divide into a depression part, which fills the depressions, and a remaining part, which is also referred to as bulk or a bulk part. Therefore, the transfer roller may be configured to roll with the contact surface of the transfer roller on a work surface of a work piece for transferring the lacquer from the contact surface to the work surface of the work piece, such that the lacquer film is transferred to the work surface. This encompassed the transfer of the lacquer from the depressions, but also the transfer of the bulk part. If the transfer of the lacquer from the depressions to the work surface, in particular to a surface of a wing, is described in the following, this shall preferable not exclude the possible transfer of the bulk part to the respective surface and/or the possible transfer of the lacquer from the depressions via the lacquer film.

Resulting from the direct contact between the muzzle end of the slit nozzle and the outside surface of the lateral wall of the transfer roller, preferably if the slit nozzle is in the second nozzle arrangement, a desired fill level of the depressions may be ensured and/or a desired mean thickness of the lacquer film may be ensured. However, a resulting contact force and/or a resulting contact friction should not change as much as possible during a rotation of the transfer roller in order to prevent a slip-stick-effect.

But a desired fill level of the depression may also be ensured and/or a desired mean thickness of the lacquer film on the outside surface of the lateral wall may be ensured, if the muzzle end of the slit nozzle is arranged contactless to the outside contact surface of the lateral wall, in particular, if the slit nozzle is arranged according to the first nozzle arrangement. A distance formed by the gap between the slit nozzle and the outside contact surface at the second deformation section may be predefined by an arrangement of the slit nozzle according to the second nozzle arrangement, such that lacquer dispensed by the slit nozzle continuously forms the lacquer film on the on the outside surface of the lateral wall, preferably with a predefined thickness. The dispensed lacquer therefore fills the aforementioned gap with the lacquer. As an effect, lacquer also fills the depressions of the outside contact surface at the second deformation section of the lateral wall. As a further effect, a bulk part may also be applied to the outside contact surface at the second deformation section of the lateral wall.

According to an exemplary embodiment, the support device supports, i.e. contacts the rim at an inner surface of the rim directed to the axis of rotation. The support device may extend from the second end inside the rim and to the inner surface, wherein it might encompass the outer edge of the rim at the second end, e.g. by a roller bearing, preferably extending along a portion of the circumference or along the entire circumference of the rime at the inner surface. By such a support from inside the rim, support in both upwards and downwards directions as well as along the entire circumference can be provided easily.

According to an alternative embodiment, at the second end a cylindrical projection portion of the rim projects beyond the tire, i.e. out from the tire, exceeding the tire, in a direction parallel to the axis of rotation, so that an outer surface of the projection portion of the rim is uncovered, i.e. not covered by the tire. The support device supports, i.e. contacts the rim at the projection portion, preferably at the uncovered outer surface of the projection portion and preferably at the upper half of the rim remote from the work surface. Such a support from outside the rim is very simple and can be easily removed for change of the transfer roller.

In particular, the projection portion may have a width in a direction parallel to the axis of rotation of between 1% and 30%, between 2% and 10%, or between 3% and 5% of the width of the tire in a direction parallel to the axis of rotation. Such a width provides sufficient support surface to engage with the support device.

The support device may support the rim at the outer surface of the projection portion by a roller bearing. Such a roller bearing represents a simple and low-friction bearing.

The roller bearing may comprise a support structure mounted to the frame, and at least one support roller, for example, a plurality of circumferentially spaced support rollers, mounted to the support structure rotatably about an axis of rotation parallel to the axis of rotation of the transfer roller and with its circumferential outer surface engaging the outer surface of the projection portion of the rim. If only one support roller is provided, it is preferably arranged centrally above the rim. If several support rollers are provided, these are preferably symmetrically spaced from one another in the upper half of the rim.

The support structure may comprise a bent roller holder, for example, formed as a segment of a circle and extending circumferentially around a part of the circumference of the outer surface of the projection portion. A plurality of support rollers are rotatably mounted to the roller holder spaced from one another and with their circumferential outer surface engaging the outer surface of the projection portion. In such a way, the roller holder with the support rollers mounted thereto is in the form of a hood contacting the outer surface of the rim at several points simultaneously, so that the loads are distributed and a support is provided not only in the direction perpendicular to the work surface but also parallel to the work surface.

Two support rollers, three support rollers, or for example four support rollers may be provided. Four support rollers can provide efficient support both in the direction perpendicular to the work surface and in the direction parallel to the work surface.

The support rollers may be arranged symmetrically with respect to a vertical center line of the rim intersecting the axis of rotation of the transfer roller. Such a symmetrical arrangement of the support rollers leads to a symmetric load transfer.

The support rollers may be arranged to engage the outer surface of the projection portion in an area above a horizontal center line of the rim intersecting the axis of rotation of the transfer roller, i.e. in an upper half of the rim remote from the work surface. In such a way, the support device can be easily removed from the rim in an upwards direction.

According to an exemplary embodiment the support device, in particular the support structure, is mounted to the frame pivotally or removably, so that the transfer roller can be removed in the direction of the second end, and replaced if necessary. The support device, in particular the support structure, might also be adjustable to adjust to different rim sizes.

BRIEF DESCRIPTION OF THE DRAWINGS

Further features, advantages and application possibilities of the present invention may be derived from the following description of exemplary embodiments and/or the figures. Thereby, all described and/or visually depicted features for themselves and/or in any combination may form an advantageous subject matter and/or features of the present invention independent of their combination in the individual claims or their dependencies. Furthermore, in the figures, same reference signs may indicate same or similar objects.

In the accompanying drawings, like reference characters refer to the same or similar parts throughout the different views. The drawings are not necessarily to scale, emphasis instead being placed upon illustrating particular principles, discussed below.

DETAILED DESCRIPTION OF SOME EMBODIMENTS

Some embodiments will now be described with reference to the Figures.

Figure 1:
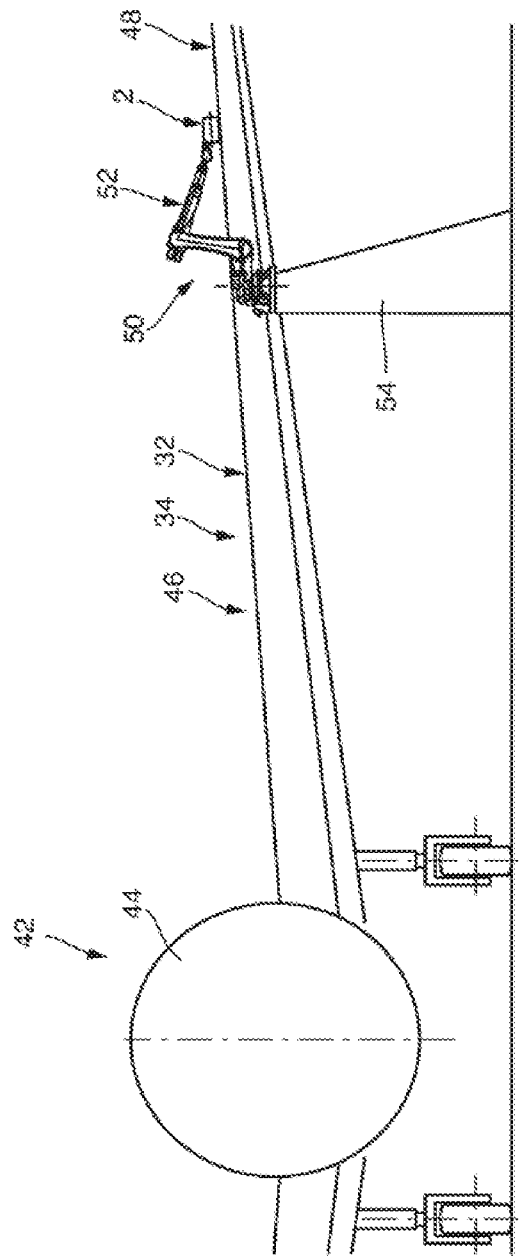
FIG. 1 schematically illustrates a part of an aircraft wherein a device arranged for transferring lacquer on an upper wing surface.

FIG. 1 schematically illustrates an aircraft 42, which comprises a fuselage 44 and a wing 46. The air resistance of the aircraft 42 can be reduced, if the upper wing surface 48 of the wing 46 comprises a profile structure. It has been found of advantage, if this profile structure is a microstructure.

FIG. 1 also schematically shows a robot 50, which is seated on a rack 54. The robot 50 comprises a movable robot arm 52. A device 2 is mounted at an end of the robot arm 52, such that the device 2 can be moved by the robot 50.

The device 2 is configured for transferring a lacquer onto a work surface 32 of a workpiece 34. According to the example shown in FIG. 1, the workpiece 34 can be formed by the wing 46 of the aircraft 42. Thus, the upper wing surface 48 can form the work surface 32.

Figure 2:
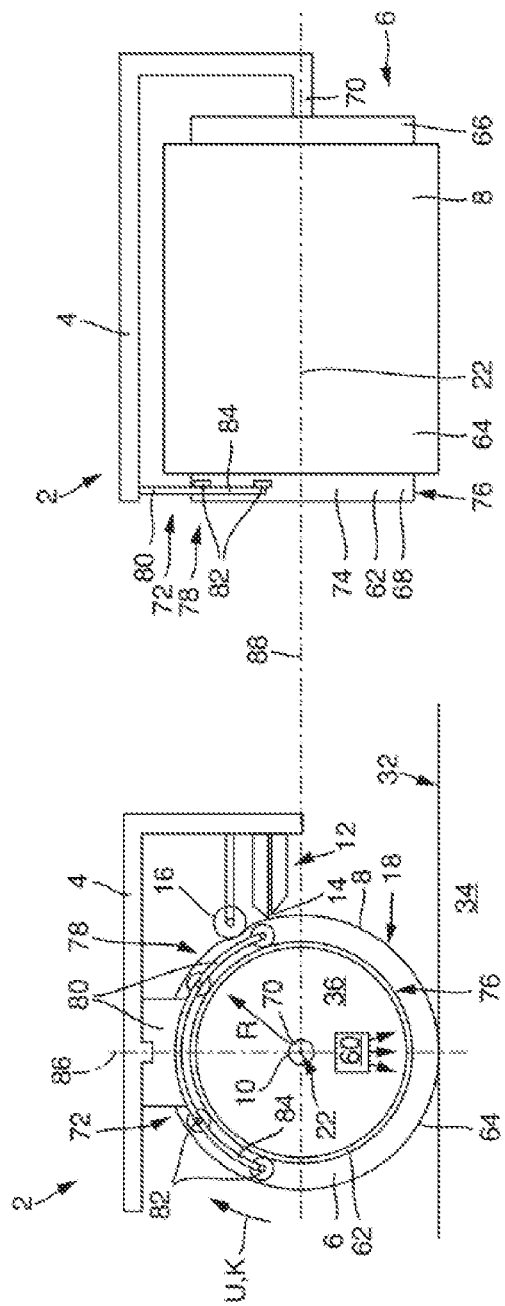
FIGS. 2a and 2b schematically illustrate an embodiment of the device in a cross-sectional view and in a side view.

A first embodiment of the device 2 is schematically illustrated in FIG. 2 in a cross-sectional view. The device 2 comprises a frame 4, a transfer roller 6 with a circumferential lateral wall 8, a drive unit 10, a slit nozzle 12 with a muzzle end 14 for dispensing lacquer, and a deformation unit 16. The transfer roller 6 may also be referred to as a transfer tire. The device 2 can be attached via the frame 4 to the robot arm 52. However, instead of a robot 50 any other handling device may also be used, which is configured to move the device 2 in space. The frame 4 may be adapted to be releasably connected to a handling device, such as the robot 50.

The transfer roller 6 is mounted rotatably, in particular by means of at least one bearing, about an axis of rotation 22 at the frame 4. An outside contact surface 8 of the lateral wall 6 comprises several depressions 20. The depressions 20 may be evenly or stochastically distributed about the circumference of the lateral wall 6. The FIGS. 3 and 4 show a part of the transfer roller 6 in a cross-section view and a top view, respectively.

Figure 3:
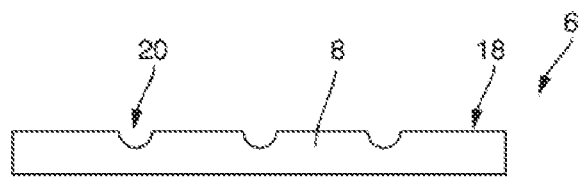
FIG. 3 schematically illustrates a part of the lateral wall of the transfer roller in a cross-sectional view.

As schematically indicated in FIG. 3, the depressions 20 can be formed by recesses arranged at the outside surface 18 of the lateral wall 8 of the transfer roller 6. The depressions 20 can have a predefined size and/or structure. A mean structure size of the depressions 20 can be in the range of 0.1 micrometer to 100 micrometer. In other words, each of the depressions 20 may have a microstructure.

Figure 4:
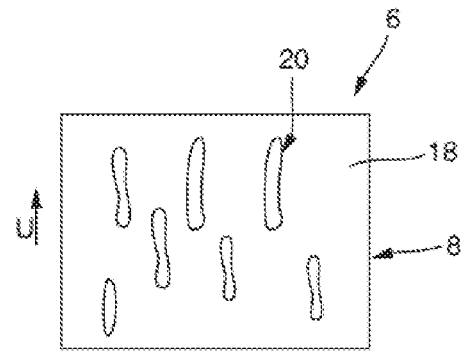
FIG. 4 schematically illustrates a further embodiment of the lateral wall of the transfer roller in a top view.

FIG. 4 exemplarily shows the depressions 20 of a part of the lateral wall 8 of the transfer roller 6 in a top view. Each of the depressions 20 may comprise an elongated extension in a circumferential direction U of the lateral wall 8 of the transfer roller 6.

Each of the depressions 20 is configured to receive lacquer and to transfer this received lacquer to a work surface 32 of a work piece 34, such as the upper wing surface 48 of a wing 26. Therefore, the several depressions 20 at the outside contact surface 18 of the lateral wall 8 may be arranged and/or formed according to a predefined structure, in particular a microstructure. The lateral wall 8 may be made of silicone, such that a damage of the wing surface 48 can be prevented.

If the depressions 20 are filled with a lacquer and if the outside contact surface 18 comes into contact with the work surface 32, in particular the upper wing surface 48, the lacquer previously received in the depressions 20 is transferred to the work surface 32, in particular the upper outside surface 48 of the aircraft 42. This transferred lacquer has a structure, in particular microstructure, corresponding to a structure defined by depressions 20. Thus, the outside contact surface 18 with its depressions 20 is configured for embossing a lacquer-structure, in particular a lacquer-microstructure, on the work surface 32, in particular the upper wing surface 48.

As schematically illustrated in FIG. 2, the slit nozzle 12 is directly or indirectly connected to the frame 4. Thus, the slit nozzle 12 may be mounted to the frame 4. Furthermore, the deformation unit 16 is directly or indirectly connected to the frame 4. For instance, the deformation unit 16 may be mounted on the frame 4. According to an example not illustrated in FIG. 2, the slit nozzle 12 and the deformation unit 16 may be formed by an integrated unit. But the slit nozzle 12 may also be directly connected to the deformation unit 16, or vice versa. Thus, the slit nozzle 12 and the deformation unit 16 may be mounted in series to the frame 4.

The device 2 also comprises the drive unit 10. The drive unit 10 is configured to drive the transfer roller 6 in a rotation direction K about the axis of rotation 22.

The lateral wall 8 of the transfer roller 6 is elastically deformable in a radial direction R of the transfer roller 6. The lateral wall 8 of the transfer roller 6 can be made of an elastomer plastic, a silicone or any other elastically deformable plastic material. The lateral wall 8 of the transfer roller 6 may be made of a synthetic, elastically deformable silicone. As a result, the lateral wall 8 can be at least sectionwise deformed in positive or negative radial direction R. The deformation unit 16 is configured to deform the lateral wall 8 in the radial direction R of the transfer roller 6 upstream from the slit nozzle 12 to provide a stable distance of the lateral wall 8 to the muzzle end 14 of the slit nozzle 12 for a defined application of lacquer to the outside contact surface 18 of the lateral wall 8. If references made to the radial direction R, this may refer to the positive radial direction R or an opposite negative radial direction.

The device 2 further comprises a hardening unit 60. The hardening unit 60 is configured for hardening the lacquer in a contactless way. The hardening unit 60 is formed by an UV-light unit. The hardening unit 60 is directly or indirectly connected to the frame 4. Moreover, the hardening unit 60 is arranged within the interior space 36 formed by the transfer roller 6. The lateral wall 8 of the transfer roller 6 is configured to transmit UV-light-waves. Thus, the lateral wall 8 is transparent for UV-light. The hardening unit 60 is arranged, such that UV-light is emitted towards the work surface 32 upon which the lateral wall 8 of the transfer roller 6 rolls.

The lacquer is hardenable via UV-light. Therefore, the device is configured to control the drive unit 10 and/or the hardening unit 60 such that lacquer transferred to the work surface 32 is immediately hardened via UV-light emitted by the hardening unit 60.

As shown in FIGS. 2a and 2b, the transfer roller 6 comprises a rim 62 and a tire 64. The rim 62 is mounted to the frame 4 rotatably about the axis of rotation 22, and extends between a first end 66 and a second end 68 along the axis of rotation 22. The tire 64 is mounted on the rim 62 and includes the lateral wall 8. The rim 62 is rotatably mounted to the frame 4 by the first end 66. Specifically, the rim 62 is rotatably mounted to the frame 4 by a shaft 70 mounted to the frame 4 and extending to the inside of the rim 62 from the first end 66, so that the rim 62 rotates on the shaft 70.

The rim 62 is additionally supported at the second end 68, primarily in a direction to the work surface 32, but also in a direction parallel to the work surface 32, by a support device 72 that is mounted to the frame 4. The support device 72 provides additional support from above at the second end 68 of the rim 62 when the transfer roller 6 is pressed onto the work surface 32 for lacquer transfer, so that vibrations at the second end 68 are eliminated.

At the second end 68 a cylindrical projection portion 74 of the rim 62 projects beyond the tire 64 in a direction parallel to the axis of rotation 22, so that an outer surface 76 of the projection portion 74 of the rim 62 is uncovered. The support device 72 supports the rim 62 at the uncovered outer surface 76 of the projection portion 74. The projection portion 74 has a width in a direction parallel to the axis of rotation 22 of between 3% and 5% of the width of the tire 64 in a direction parallel to the axis of rotation 22.

The support device 72 supports the rim 62 at the outer surface 76 of the projection portion 74 by a roller bearing 78. The roller bearing 78 comprises a support structure 80 and a plurality of support rollers 82, in the present embodiment four support rollers 82. The support structure 80 comprises a bent roller holder 84 formed as a segment of a circle and extending circumferentially around a part of the circumference of the outer surface 76 of the projection portion 74. The four support rollers 82 are rotatably mounted to the roller holder 84 spaced from one another and with their circumferential outer surface engaging the outer surface 76 of the projection portion 74.

The support rollers 82 are arranged symmetrically with respect to a vertical center line 86 of the rim 62 and are arranged to engage the outer surface 76 of the projection portion 74 in an area above a horizontal center line 88 of the rim 62 in an upper half of the rim 62 remote from the work surface 32.

The support structure 80 is mounted to the frame pivotally or removably, so that the transfer roller 6 can be removed in the direction of the second end 68. The support structure 80 is also adjustable to adjust to different rim sizes.

It is additionally pointed out that "comprising" does not rule out other elements, and "a" or "an" does not rule out a multiplicity. It is also pointed out that features that have been described with reference to one of the above exemplary embodiments may also be disclosed as in combination with other features of other exemplary embodiments described above. Reference signs in the claims are not to be regarded as restrictive.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for lacquer transfer, comprising:
    a frame,
    a transfer roller with a circumferential lateral wall, and
    a nozzle for dispensing lacquer,
    wherein the nozzle is connected to the frame,
    wherein an outside contact surface of the lateral wall comprises several depressions,
    wherein the transfer roller is mounted rotatably about an axis of rotation to the frame,
    wherein the nozzle is arranged contactless to or in direct contact with the outside contact surface of the lateral wall for dispensing lacquer into respective depressions in the lateral wall while the transfer roller is rotated about the axis of rotation,
    wherein the transfer roller is configured to roll with the outside contact surface on a work surface of a work piece for transferring the lacquer from the depressions to the work surface of the work piece,
    wherein the transfer roller comprises a rim and a tire,
    wherein the rim is mounted to the frame rotatably about the axis of rotation, and extends between a first end and a second end along the axis of rotation,
    wherein the tire is mounted on the rim and includes the lateral wall,
    wherein the rim is rotatably mounted to the frame by the first end,
    wherein the rim is additionally supported at the second end at least in a direction perpendicular to the work surface by a support device that is mounted to the frame and,
    wherein the support device supports the rim at a cylindrical projection portion by a roller hearing comprising a support structure mounted to the frame, and at least one support roller rotatably mounted to the support structure and partially circumferentially engaging the outer surface of the projection portion.

2. The device according to claim 1, wherein the support device supports the rim at an inner surface of the rim.

3. The device according to claim 1, wherein at the second end the cylindrical projection portion of the rim projects beyond the tire in a direction parallel to the axis of rotation, so that an outer surface of the projection portion of the rim is uncovered, and wherein the support device supports the rim at the uncovered outer surface of the projection portion.

4. The device according to claim 3, wherein the projection portion has a width in a direction parallel to the axis of rotation of between 1% and 30% of the width of the tire.

5. The device according to claim 1, wherein the support structure comprises a bent roller holder extending circumferentially around a part of the circumference of the outer surface of the projection portion, and wherein a plurality of support rollers are rotatably mounted to the roller holder spaced from one another and engaging the outer surface of the projection portion.

6. The device according to claim 5, wherein two support rollers, three support rollers, or four support rollers are provided.

7. The device according to claim 5, wherein the support rollers are arranged symmetrically with respect to a vertical center line of the rim.

8. The device according to claim 5, wherein the support rollers are arranged to engage the outer surface of the projection portion in an area above a horizontal center line of the rim.

9. The device according to claim 1, wherein the support device is mounted to the frame pivotally or removably.

10. The device according to claim 3, wherein the projection portion has a width in a direction parallel to the axis of rotation of between 2% and 10% of the width of the tire.

11. The device according to claim 3, wherein the projection portion has a width in a direction parallel to the axis of rotation of between 3% and 5% of the width of the tire.

12. A device for lacquer transfer, comprising:

a frame, a transfer roller with a circumferential lateral wall, and a nozzle for dispensing lacquer, wherein the nozzle is connected to the frame, wherein an outside contact surface of the lateral wall comprises several depressions, wherein the transfer roller is mounted rotatably about an axis of rotation to the frame, wherein the nozzle is arranged contactless to or in direct contact with the outside contact surface of the lateral wall for dispensing lacquer into respective depressions in the lateral wall while the transfer roller is rotated about the axis of rotation, wherein the transfer roller is configured to roll with the outside contact surface on a work surface of a work piece for transferring the lacquer from the depressions to the work surface of the work piece, wherein the transfer roller comprises a rim and a tire, wherein the rim is mounted to the frame rotatably about the axis of rotation, and extends between a first end and a second end along the axis of rotation, wherein the tire is mounted on the rim and includes the lateral wall, wherein the rim is rotatably mounted to the frame by the first end, wherein the rim is additionally supported at the second end at least in a direction perpendicular to the work surface by a support device that is mounted to the frame, and wherein the support device supports the rim at a projection portion by a roller bearing comprising a support structure mounted to the frame comprising a bent roller holder extending circumferentially around a part of the circumference of the outer surface of the projection portion.

* * * * *